United States Patent
Banach et al.

(10) Patent No.: US 6,265,527 B1
(45) Date of Patent: Jul. 24, 2001

(54) METHOD FOR MAKING POLYESTER CARBONATES

(75) Inventors: Timothy Edward Banach, Scotia; Gary Charles Davis, Albany; Bill Kengliem Lui, Gloversville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/431,277

(22) Filed: Nov. 1, 1999

(51) Int. Cl.$^7$ .................................................. C08G 64/00
(52) U.S. Cl. ............................................ 528/198; 528/196
(58) Field of Search ..................... 528/196, 198

(56) References Cited

U.S. PATENT DOCUMENTS

| | | | |
|---|---|---|---|
| 3,030,331 | 4/1962 | Goldberg | 528/196 |
| 3,169,121 | 2/1965 | Goldberg | 528/196 |
| 3,207,814 | 9/1965 | Goldberg | 528/196 |
| 4,194,038 | 3/1980 | Baker et al. | 528/196 |
| 4,217,438 | 8/1980 | Brunelle et al. | 528/196 |
| 4,238,596 | 12/1980 | Quinn | 528/196 |
| 4,238,597 | 12/1980 | Markezich et al. | 528/196 |
| 4,487,896 | 12/1984 | Mark et al. | 528/196 |
| 4,506,065 | 3/1985 | Miller et al. | 528/196 |
| 4,983,706 | 1/1991 | Fontana et al. | 528/196 |
| 5,606,007 | 2/1997 | Sakashita et al. | 528/196 |

FOREIGN PATENT DOCUMENTS 4345616  5/1991  (JP) .

*Primary Examiner*—Terressa M. Boykin
(74) *Attorney, Agent, or Firm*—Bernadette M. Bennett; Noreen C. Johnson

(57) ABSTRACT

A melt condensation polymerization process for preparing polyester carbonate is provided. The process includes the steps of pre-reacting a carbonic acid diester and catalyst with a diacid and reacting at least one aromatic dihydroxy compound with the reacted pre-reaction mixture.

29 Claims, No Drawings

METHOD FOR MAKING POLYESTER CARBONATES

BACKGROUND OF THE INVENTION

The present invention relates to a method for making polyester carbonates. More particularly, the present invention relates to a melt condensation polymerization method involving the pre-reaction of a carbonic acid diester and catalyst with a diacid followed by the reaction of an aromatic dihydroxy compound with the reacted pre-reaction mixture.

Polyester carbonates and methods for their preparation have been studied extensively throughout the years. Polyester carbonates are thermoplastic resins that are clear and have high impact resistance. Due to their optical clarity and physical properties, polyester carbonates are used extensively in injection molding, applications. The synthetic methods commonly used to make polyester carbonates are interfacial polymerization and melt condensation polymerization.

Interfacial polymerization is a well-known process. Fontana et al., U.S. Pat. No. 4,983,706, discuss the reaction of an aromatic dihydroxy compound such as bisphenol-A with phosgene and a diacid. The diacid is incorporated into the reaction mixture to produce a polyester carbonate with melt flow such that the polyester carbonate is suitable for purposes of injection molding. Melt flow can be described in terms of viscosity. Although the polyester carbonate produced by the interfacial method provides excellent viscosity for injection molding, purposes, particulate contamination is often a problem. Additionally, the interfacial method uses a hazardous chemical, phosgene, and an environmentally hazardous chlorinated solvent.

Melt condensation polymerization is a known synthetic process which often results in less particulates found in the polymer compared to the interfacial method. Although melt condensation polymerization does not involve hazardous chemicals, the polyester carbonates made by the melt condensation polymerization process often do not have the flow properties of polyester carbonate made by the interfacial method.

In order to improve the flow properties of polyester carbonates made by the melt condensation polymerization process, different methods have been studied. Sakashita et al. (Japanese Patent No. Hei 4[1992]-345616) discuss a method for preparing polyester carbonates which incorporates aliphatic diacids directly into the polyester carbonate using a melt polymerization process. This method is only concerned with polyester carbonates which contain the aromatic dihydroxy compound, 2,2,2', 2'-tetrahydro-3,3,3', 3'-tetramethyl- 1,1'-spirobi[1H-indene]-6,6'-diol, commonly known as SBI. The melt condensation polymerization method of Sakashita et al. adds the aliphatic diacid, aromatic dihydroxy compounds and catalysts in a one-step reaction.

Methods continue to be sought to prepare high quality polyester carbonates which can be used for injection molding purposes using the melt condensation polymerization process.

BRIEF SUMMARY OF THE INVENTION

The present invention provides a melt condensation polymerization process for preparing polyester carbonates. The process involves the steps of:
(I) pre-reacting a carbonic acid diester and catalyst with a diacid; and
(II) reacting at least one aromatic dihydroxy compound with the reacted pre-reaction mixture.

DETAILED DESCRIPTION OF THE INVENTION

The present invention relates to a melt condensation polymerization process for preparing polyester carbonates which involves the pre-reaction of carbonic acid diester, catalyst and a diacid subsequently followed by a reaction of at least one aromatic dihydroxy compound with the reacted pre-reaction mixture. Melt condensation polymerization has been found to be an effective process for the formation of polyester carbonates.

In one embodiment, the composition of the present invention comprises a polyester carbonate comprising structural units of the formula I

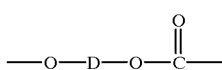

(I)

wherein D is a divalent aromatic radical; and repeating or recurring units of the formula II:

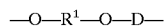

(II)

wherein D has the meaning previously ascribed to it in formula I and $R^1$ is at least one divalent moiety selected from those of the formulae III, IV and V:

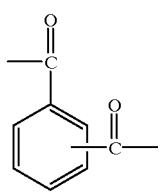

(III)

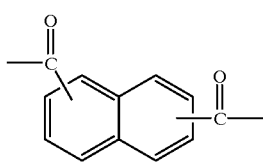

(IV)

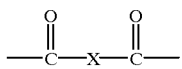

(V)

wherein X is a linear aliphatic group, branched aliphatic group, or cyclic aliphatic group. Linear and branched aliphatic groups are preferably those containing from 2 to about 20 carbon atoms, and include as illustrative non-limiting examples ethyl, propyl, isopropyl, butyl, tertiary-butyl, pentyl, neopentyl, hexyl, octyl, decyl, dodecyl. Cyclic aliphatic groups include cyclo- or bicycloalkyl radicals, preferably those containing from 3 to about 12 ring carbon atoms with a total number of carbon atoms less than or equal to 50. Some illustrative non-limiting examples of these cyclic aliphatic groups include cyclobutyl, cyclopentyl, cyclohexyl, methylcyclohexyl, and cycloheptyl. Aliphatic groups also include aralkyl radicals containing from 7 to 14 carbon atoms; these include, but are not limited to, benzyl, phenylbutyl, phenylpropyl, and phenylethyl.

The polyester carbonates which find use in the instant invention are well known in the art as disclosed in, for example, U.S. Pat. Nos. 3,030,331; 3,169,121; 3,207,814; 4,238,596; 4,238,597; 4,487,896; 4,506,065, and in copending application Ser. No. 09/181,902, filed Oct. 29, 1998, and assigned to the same assignee as the instant application.

The first step of the melt condensation polymerization process is a pre-reaction of a carbonic acid diester, catalyst and diacid. The pre-reaction as used herein refers to an esterification process. The pre-reaction of the diacid and carbonic acid diester forms a carboxylic diester compound. The pre-reaction is allowed to proceed to substantially complete conversion of the diacid to a carboxylic diester compound. "Substantially complete conversion" as used herein refers to the reaction of the diacid and carbonic acid diester wherein at least 95% of the diacid and carbonic acid diester react to form a carboxylic diester compound.

Carbonic acid diesters are of the general formula, $R_2(CO_3)$ wherein R is an alkyl or aryl group. Typical examples of carbonic acid diesters include, but are not limited to, diphenyl carbonate, ditolyl carbonate, bis (chlorophenyl) carbonate, m-cresyl carbonate, dinaphthyl carbonate, diethyl carbonate, dimethyl carbonate, dibutyl carbonate, dicyclohexyl carbonate and mixtures thereof. The carbonic diester most typically used is diphenyl carbonate.

Diacids are of the general formula: $R(COOH)_2$ wherein R is an alkyl or aryl group. Examples of diacids include, but are not limited to, aliphatic diacids, aromatic diacids, and mixtures thereof. Examples of aliphatic diacids are adipic acid, sebacic acid, dodecanedioic acid, C-19 diacid, C-36 dimer diacid; and aromatic diacids such as isophthalic acid, terephthalic acid and 2,6-napthalenedicarboxylic acid.

The addition of the diacids to the melt condensation polymerization process effectively improves the melt viscosity of the polyester carbonate. Melt viscosity as used herein refers to the ability of a melted polyester carbonate to flow. Low melt viscosity enables rapid and efficient injection molding of the polyester carbonate.

Typical catalysts employed in the melt condensation polymerization process include, but are not limited to, alkali metal compounds, alkaline earth metal compounds, quaternary ammonium compounds and combinations thereof.

Useful alkali metal compounds as catalysts include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenolate, sodium benzoate, potassium benzoate, lithium benzoate, disodium hydrogenphosphate, dipotassium hydrogenphosphate, dilithium hydrogenphosphate, disodium, dipotassium and dilithium salts of biphenol A and sodium, potassium, and lithium salts of phenol.

Useful alkaline earth metal compounds as catalysts include calcium hydroxide, barium hydroxide, magnesium hydroxide, strontium hydroxide, calcium hydrogen carbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Useful quaternary ammonium compounds as catalysts include tetraalkylammonium compounds such as tetramethylammonium hydroxide and tetraethylammonium hydroxide.

Preferred catalysts include tetramethylammonium hydroxide, sodium hydroxide and mixtures thereof.

In order to form polyester carbonates, two moles of the carbonic acid diester are needed for each mole of diacid and one mole of the carbonic acid diester is needed for each mole of aromatic dihydroxy compound. Catalyst is present in a range between about $10^{-8}$ moles and about $10^{-3}$ moles to moles of aromatic dihydroxy compound. In another embodiment, the catalyst is present in a range between about $10^{-7}$ moles and about $10^{-5}$ moles to moles of aromatic dihydroxy compound.

The pre-reaction process is typically carried out at a temperature in a range between about 180° C. and about 270° C. Commonly, the pre-reaction is carried out at a temperature in a range between about 220° C. and about 260° C. More commonly, the pre-reaction is carried out in a temperature in a range between about 230° C. and about 250° C. The reaction vessel is typically kept in a range between atmospheric pressure and about 200 torr for the pre-reaction.

The formation of the diester from the pre-reaction of the carbonic acid diester, catalyst and diacid ensures substantially complete incorporation of the diacid into the polyester carbonate. "Substantially complete incorporation" as used herein refers to a polyester carbonate wherein at least 95% of the diacid used as starting material is incorporated into the polyester carbonate product. In order to monitor complete conversion of the diacid to a diester, proton nuclear magnetic resonance spectroscopy may be used to confirm the formation of the diester.

After the diester has been formed in the pre-reaction step, the second step of the melt condensation polymerization process involves the reaction of at least one aromatic dihydroxy compound with the diester compound formed in the pre-reaction step. The step of reacting at least one aromatic dihydroxy compound with the diester compound is referred to herein as the condensation process. At least one aromatic dihydroxy compound is commonly added to the reacted pre-reaction mixture under inert gas conditions. "Inert gas conditions" as used herein refers to a reaction vessel which is purged and refilled with an inert gas, for example, nitrogen, argon or helium.

Suitable aromatic dihydroxy compounds for preparing polyester carbonates include those represented by the formula VI

   (VI)

wherein D is a divalent aromatic radical as defined in formula I. Preferably, D has the structure of formula VII:

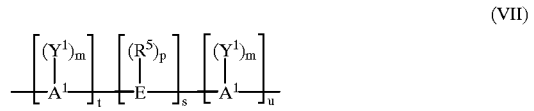   (VII)

wherein $A^1$ represents an aromatic group such as phenylene, biphenylene, and naphthylene. E may be an alkylene or alkylidene group such as methylene, ethylene, ethylidene, propylene, propylidene, isopropylidene, butylene, butylidene, isobutylidene, amylene, amylidene, and isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage such as silane or siloxy; or a sulfur-containing linkage such as sulfide, sulfoxide, or sulfone; or a phosphorus-containing linkage such as phosphinyl or phosphonyl. In addition, E may be a cycloaliphatic group, such as cyclopentylidene, cyclohexylidene, 3,3,5-trimethylcyclohexylidene, methylcyclo-hexylidene, 2-[2.2.1]-bicycloheptylidene, neopentylidene, cyclopentadecylidene, cyclododecylidene, and adamantylidene. $R^5$ represents hydrogen or a monovalent hydrocarbon group such as alkyl radicals, aryl radicals, aralkyl radicals, alkaryl radicals, cycloalkyl radicals, or bicycloalkyl radicals. The term "alkyl radical" is intended to designate both normal alkyl and branched alkyl radicals. Normal and branched alkyl radicals are preferably those containing from 2 to about 20 carbon atoms, and include as illustrative non-limiting examples ethyl, propyl, isopropyl, butyl, tertiary-butyl, pentyl, neopentyl, hexyl, octyl, decyl, dodecyl. Aryl radicals include examples such as phenyl and tolyl. Cyclo- or bicycloalkyl radicals represented are preferably those containing from 3 to about 12 ring carbon atoms with a total number of carbon atoms less than or equal to 50. Some illustrative non-limiting examples of these cycloalkyl radicals include cyclobutyl, cyclopentyl, cyclohexyl, methylcyclohexyl, and cycloheptyl. Preferred aralkyl radicals are those containing from 7 to about 14 carbon atoms; these include, but are not limited to, benzyl, phenylbutyl, phenylpropyl, and phenylethyl.

$Y^1$ may be a halogen, such as fluorine, bromine, chlorine, and iodine; a tertiary nitrogen group such as dimethylamino; an organic group such as $R^5$ above, or an alkoxy group such as OR wherein R is an alkyl or aryl group; it being only necessary that $Y^1$ be inert to and unaffected by the reactants and reaction conditions used to prepare the polyester carbonate. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the aromatic dihydroxy phenol compound in which D is represented by formula VII above, when more than one $y^1$ substituent is present, $Y^1$ may be the same or different. For example, the $Y^1$ substituent may be a combination of different halogens. The $R^5$ substituent may also be the same or different if more than one $R^5$ substituent is present. Where "s" is zero in formula VII and "u" is not zero, the aromatic rings are directly joined. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of aromatic dihydroxy compounds of formula VI include the dihydroxy-substituted aromatic hydrocarbons disclosed by genus or species in U.S. Patent 4,217,438. Some preferred examples of aromatic dihydroxy compounds include 4,4'-(3,3,5-trimethylcyclohexylidene)diphenol; 2,2-bis(4-hydroxyphenyl )propane (commonly known as bisphenol A); 2,2-bis(4-hydroxy-3,5-dimethylphenyl)propane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)propane; bis(4-hydroxyphenyl)cyclohexylmethane; 2,2-bis(4-hydroxyphenyl)-1-phenylpropane; 2,2-bis(4-hydroxy-3-methylphenyl)propane (commonly known as DMBPC); resorcinol; and $C_{1-3}$ alkyl-substituted resorcinols.

Most typically, 2,2-bis(4-hydroxyphenyl)propane is the preferred aromatic dihydroxy compound. Combinations of aromatic dihydroxy compounds also can be used.

Once at least one aromatic dihydroxy compound has been added to the reaction vessel containing the reacted pre-reaction mixture, the temperature is raised to a temperature in a range between about 250 ° C. and about 320° C., and in another embodiment, in a range between about 270° C. and about 300° C. The pressure in the reaction vessel is gradually reduced to a pressure in a range between about 50 torr and about 0.01 torr. At the increased temperature and decreased pressure, distillation of byproducts, such as phenol, occurs.

The pre-reaction step and the addition of at least one aromatic dihydroxy compound to the reacted pre-reaction mixture occurs in either batch mode, continuous or semi-continuous mode. With a batch mode reaction, for instance, all of the components are combined and reacted until most of the reactants are consumed. In order to proceed, the reaction has to be stopped and additional reactant added. With continuous or semi-continuous conditions, the reaction does not have to be stopped in order to add more reactants.

Following completion of the melt condensation polymerization process, the polyester carbonate may be recovered and isolated by conventional procedures. These may include, for example, at least one step of anti-solvent precipitation, washing, drying and devolatilization-pelletization via extrusion.

Polyester carbonates obtained by the present invention can be used in a wide variety of applications. For example, polyester carbonates may be used as optical data storage components such as compact discs and cartridges; indoor and outdoor lighting lenses, housings and covers; computers and cases in the telecommunication industry; and containers, optical lenses and eyewear.

In order that those skilled in the art will be better able to practice the invention, the following examples are given by way of illustration and not by way of limitation.

EXAMPLE 1

Pre-reaction of dodecandioic acid with diphenyl carbonate, tetramethylammonium hydroxide and sodium hydroxide A glass tube (2.5 centimeters by 20 centimeters) was pre-treated with 3 molar hydrochloric acid solution and rinsed in deionized water. Diphenyl carbonate (3.090 grams), dodecanedioic acid (0.285 grams), sodium hydroxide (6.87 microliters of a 1 millimolar solution), and tetramethylammonium hydroxide (15.30 microliters of a 0.22 molar solution) were added to the pre-treated glass tube. A magnetic stir-bar was added to the glass tube and the tube was capped with an unsecured lid (to allow -carbon dioxide to escape). The tube was placed in a 240° C. salt bath. After the contents were allowed to melt, the mixture was stirred. Aliquots were removed every 15 minutes for proton nuclear magnetic resonance spectroscopy analysis. After 90 minutes, there was complete conversion of the dodecandioic acid to the diphenyl diester.

EXAMPLE 2

Polymerization of dodecandioic acid into a polyester carbonate

A glass tube (3.8 centimeters by 30 centimeters) was pre-treated with 3 molar hydrochloric acid solution and rinsed in deionized water. Diphenyl carbonate (46.303 grams), dodecanedioic acid (4.073 grams), sodium hydroxide (98.25 microliters of a 1 millimolar solution), and tetramethylammonium hydroxide (218.8 microliters of a 0.22 molar solution) were added to the pre-treated glass tube. A stirrer was added and the tube was fitted into a melt reaction system. The tube was evacuated and refilled with nitrogen gas three times, then heated to a temperature of 240° C. The pressure in the reaction vessel was kept at atmospheric pressure. After the contents were allowed to melt, the mixture was stirred at 60 rpm. Aliquots were removed every 15 minutes for proton nuclear magnetic resonance spectroscopy analysis. After 90 minutes, there was complete conversion of the dodecanedioic acid to the diphenyl diester. 2,2-Bis(4-hydroxyphenyl)propane (40.821 grams) was charged to the tube through a port in the reactor head under positive nitrogen pressure. The temperature was raised to 270° C. and the pressure was reduced to 300 torr. Phenol was slowly distilled off over the next 80 minutes while the pressure was gradually reduced to 60 torr and the temperature raised to 270° C. The temperature was then raised to 300° C. and the pressure reduced to less than 1 torr. The melt was held at these conditions for 90 minutes, vented to atmospheric pressure with nitrogen gas and removed from the reactor as a melt.

The resulting polyester carbonate formed had a $T_g$ of 125° C. as measured by differential scanning calorimetry (DSC), a molecular weight of 64,900 as measured by gel permeation chromatography (GPC) in chloroform against a polystyrene standard and substantially complete incorporation of the dodecanedioic acid as determined by proton nuclear magnetic spectroscopy.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A process for preparing polyester carbonates comprising the steps of:
    (I) pre-reacting, under melt conditions, a carbonic acid diester and a catalyst with a diacid; and then
    (II) reacting, under melt conditions, at least one aromatic dihydroxy compound with the pre-reaction mixture thus produced.

2. The process in accordance with claim 1, wherein the diacid is selected from the group consisting of adipic acid, sebacic acid, dodecanedioic acid, C-19 dimer diacid, C-36 dimer diacid, terephthalic acid, isophthalic acid and combinations thereof.

3. The process in accordance with claim 2, wherein the diacid comprises dodecanedioic acid.

4. The process in accordance with claim 1, wherein the aromatic dihydroxy compound comprises 2,2-bis(4-hydroxyphenyl)propane.

5. The process in accordance with claim 1, wherein the catalyst is an quaternary ammonium compound, an alkali metal compound, an alkaline earth metal compound or combination thereof.

6. The process in accordance with claim 5, wherein the catalyst is tetramethylammonium hydroxide, sodium hydroxide or combinations thereof.

7. The process in accordance with claim 1, wherein the carbonic acid diester comprises diphenyl carbonate.

8. The process in accordance with claim 1, wherein the pre-reaction temperature is between about 180° C. and about 270° C.

9. The process in accordance with claim 8, wherein the pre-reaction temperature is between about 220° C. and about 260° C.

10. The process in accordance with claim 8, wherein the pre-reaction temperature is between about 230° C. and about 250° C.

11. The process in accordance with claim 1, wherein step II proceeds at a temperature between about 250° C. and about 320° C.

12. The process in accordance with claim 11, wherein step II proceeds at a temperature between about 270° C. and about 300° C.

13. The process in accordance with claim 1, wherein the diacid is present in a molar ratio to carbonic acid diester of 1:2.

14. The process in accordance with claim 1, wherein the aromatic dihydroxy compound is present in a molar ratio to carbonic acid diester of 1:1.

15. The process in accordance with claim 1, wherein the catalyst is present in a ratio of between about $10^{-8}$ moles and about $10^{-3}$ moles to moles of aromatic dihydroxy compound.

16. The process in accordance with claim 1, wherein the catalyst is present in a ratio of between about $10^{-7}$ moles and about $10^{-5}$ moles to moles of aromatic dihydroxy compound.

17. The process in accordance with claim 1, wherein the reaction of the carbonic acid diester, catalyst and diacid proceeds to substantially complete conversion to a diester.

18. The process in accordance with claim 1, wherein the reaction occurs in batch mode.

19. The process in accordance with claim 1, wherein the reaction occurs in continuous mode.

20. The process in accordance with claim 1, wherein step I occurs at a pressure in a range between about atmospheric pressure and about 200 torr.

21. The process in accordance with claim 1, wherein step II occurs at a pressure in a range between about 50 torr and about 0.01 torr.

22. A process for preparing polyester carbonates comprising the steps of:
    (I) pre-reacting, under melt conditions, diphenyl carbonate with tetramethylammonium hydroxide and dodecanedioic acid to form a pre-reaction mixture; and
    (II) reacting, under melt conditions, 2,2-bis(4-hydroxyphenyl)propane with the pre-reaction mixture thus produced.

23. The process in accordance with claim 22, wherein the pre-reaction occurs at a temperature between about 230° C. and about 250° C.

24. The process in accordance with claim 22, wherein the pre-reaction occurs at atmospheric pressure.

25. The process in accordance with claim 22, wherein the pre-reaction occurs in continuous mode.

26. The process in accordance with claim 22, wherein step II occurs at a temperature between about 270° C. and 300° C.

27. The process in accordance with claim 22, wherein step II occurs at a pressure in a range between about 50 torr and about 0.01 torr.

28. A polyester carbonate made by the process of claim 1.

29. A polyester carbonate made by the process of claim 20.

* * * * *